Jan. 25, 1966 | E. L. ABEL ETAL | 3,231,851
FLEXIBLE ELECTRICAL JUMPER CONNECTION
Filed Dec. 19, 1962
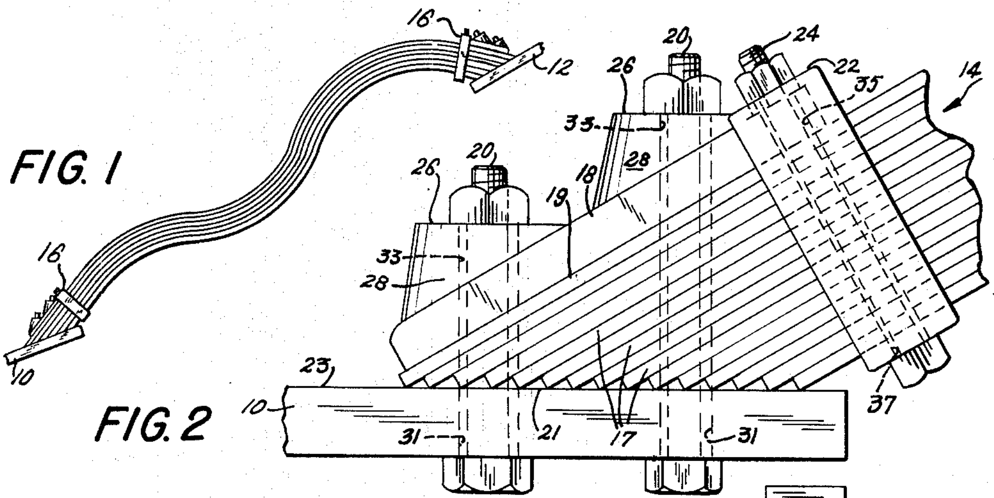
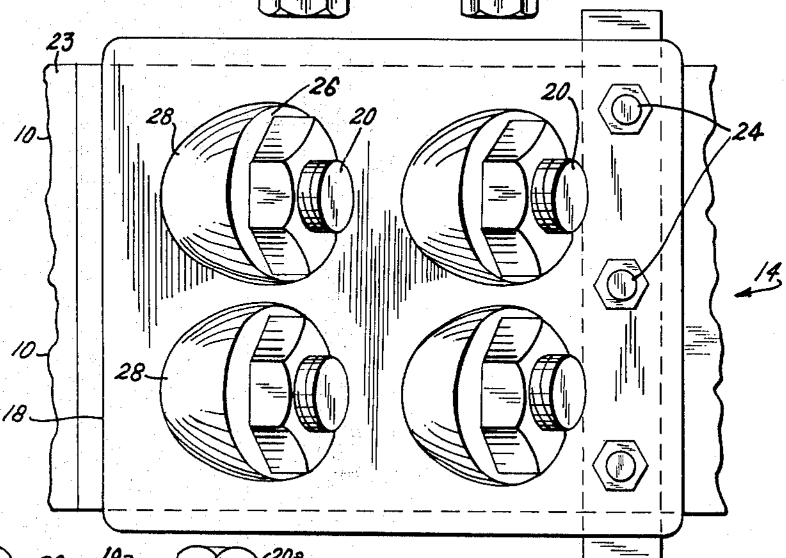
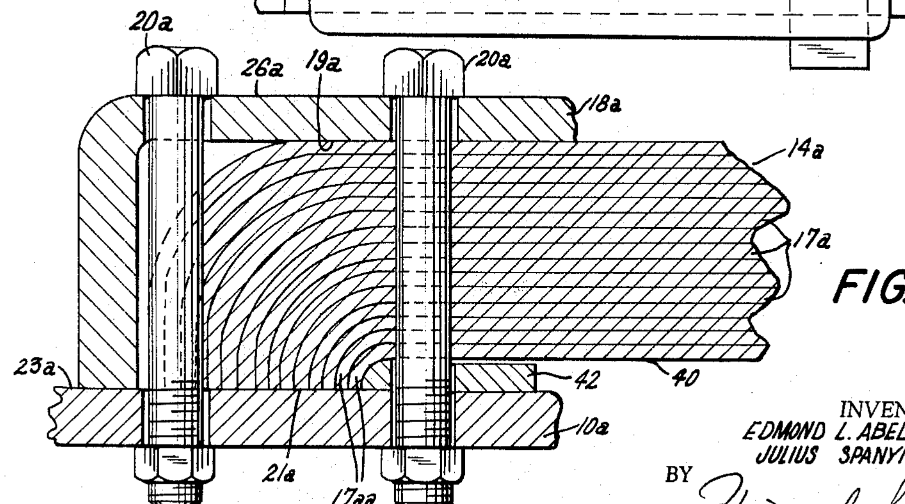
INVENTORS
EDMOND L. ABEL
JULIUS SPANYI
BY Howard S. Reiter
ATTORNEY United States Patent Office 3,231,851
Patented Jan. 25, 1966

3,231,851

FLEXIBLE ELECTRICAL JUMPER CONNECTION

Edmond L. Abel, Norwalk, and Julius G. Spanyi, South Norwalk, Conn., assignors to Burndy Corporation, a corporation of New York Filed Dec. 19, 1962, Ser. No. 245,900
5 Claims. (Cl. 339—263)

Our invention relates to electrical jumper connections between current-carrying bus bars. Bus bar jumpers conventionally consist of an assembly of laminated thin plates or flat braided cable forming a flexible loop which is clamped at its ends to the adjacent terminals of two bus bars. The flexible jumper provides an electrical path from one bar to the other while permitting relative motion between them.

It is an object of the present invention to provide a more uniform current flow between the contacting ends of a jumper. In present usage, one of the flat side surfaces of the jumper is clamped at each end in area contact with the bus terminals. The current density in jumpers thus connected tends to be greatest on that one side of the plates or cable. High current density in localized areas causes a higher voltage drop, and results in undesirable electrical heating in those areas, especially when used for the transmission of currents of magnitude, such as are required by high power industrial machines.

An object of this invention is to provide more homogeneous current distribution through the whole cross-section of a jumper, which will result in reduced voltage drop with less chance of overheating.

We accomplish this and other objects and obtain our new results as will be apparent from the constructions described in the following specification, particularly pointed out in the claims, and illustrated in the accompanying drawings, in which:

FIGURE 1 is a side elevation view of two bus bar terminals interconnected by a jumper positioned in accordance with one form of our invention;

FIGURE 2 is an enlarged side elevation view of a terminal connection such as in FIGURE 1, provided with a unique clamp for securing and positioning the jumper on the bus bar;

FIGURE 3 is a top plan view of the connection and clamp of FIGURE 2;

FIGURE 4 is a cross-sectional view of another form of jumper-bus bar connection.

The invention is characterized by a jumper connection in which the ends of the jumper are formed so as to permit the individual plates or stranded cables to directly engage the bus bar terminal surfaces.

Referring to the drawing in greater detail, reference numerals 10 and 12 designate two adjacent bus bar terminals connected by the flexible jumper 14. Clamps 16 engage the ends of the jumper and secure them to their contacting bus bars. One form of clamp is shown in FIGURE 2, wherein upper clamp plate 18 engages the jumper along surface 19 and compresses the jumper end surface 21 against the bus bar terminal surface 23 by means of bolts 20. An auxiliary clamp comprising U-shaped pressure bar 22, surrounds and secures the jumper to the clamp plate by means of bolts 24, to prevent relative motion such as might be caused by wedge action when bolts 20 are tightened.

Openings 31 in the bus bar 10 are axially aligned with openings 33 in clamp plate 18, which open on to bolt-engaging surfaces 26, to receive bolts 20. The surfaces 26 formed on bosses 28, are made parallel to the cable end surface 21 so that the bolt forces are transmitted perpendicularly between surface 21 and terminal surface 23 despite the angular position of the jumper. Apertures

35 and 37 are similarly provided in plate 18 and pressure bar 22 respectively to receive bolts 24.

End surface 21 of jumper 14 is formed of the individual transverse edges of the conductors 17 which form the body of the jumper. The edges may be angularly formed as shown by cold flow caused by the pressure developed on tightening bolts 20, or they may be cut and smoothed to shape prior to assembly to assure positive, broad area, contact. By establishing contact with surface formed in this manner a direct electrical current path between each individual conductor and the bus bar terminal surface is provided, thus assuring more uniform current distribution throughout the jumper cross section. Positioning the surface 21 at an angle less than 90° to the jumper axis, provides a greater projected area of contact and facilitates clamping by permitting application of pressure to the jumper at a point substantially perpendicularly opposite the contacting surfaces.

FIGURE 4 illustrates a jumper **14*a* having a plurality of conductors 17*a* and formed with a transverse end surfaec 21*a* substantially parallel to the immediately adjacent longitudinal surface 40 of the jumper. As in the embodiment of FIGURE 2, surface 21*a* consists of the transverse edges of each of the conductors 17*a*, to provide direct contact between each conductor and terminal surface 23*a* of a bus bar 10*a***.

Positioning surface **21*a* parallel to surface 40, i.e. parallel to the longitudinal axis of the adjacent part of the jumper body, permits bolt-engaging surface 26*a* on clamp plate 18*a* to be disposed parallel to the jumper-engaging surface 19*a* thereby permitting direct application of clamping forces by bolts 20*a*** normal to the contacting surfaces, and eliminating the wedge action produced by the inclined jumper of FIGURE 2.

A forming bar 42 may be interposed between jumper surface 40 and terminal surface **23*a* to maintain the shape of the formed end of the jumper and to assure that the transverse edges of the outermost conductors, such as 17*aa*, are properly positioned on surface 23*a*. Jumper-engaging surface 19*a*** may be formed, simply, as shown to engage only the flat portion of the jumper, or may be provided with an arcuately formed surface adapted to cooperate with the forming bar to confine and contact the jumper over both the curved and planar end surfaces, horizontally and vertically.

In both forms of the invention the clamping bolts may pass through the jumper as shown in FIGURES 2 and 3, or outside the jumper, as indicated in FIGURE 4. In the former case the cross-section of the bus bar may be increased to provide for the loss of conducting area due to the bolt holes.

In the various modifications illustrated, we have provided a jumper connection with a more uniform current distribution than has been previously accomplished. The resultant reduction in voltage drop and current dissipation through resistance heating provides a cooler connection with longer life, greater efficiency, and less danger to surrounding equipment.

We have thus described our invention, but we desire it understood that it is not confined to the particular forms or uses shown and described, the same being merely illustrative, and that the invention may be carried out in other ways without departing from the spirit of our invention and, therefore, we claim boardly the right to employ all equivalent instrumentalities coming within the scope of the appended claims, and by means of which objects of our invention are obtained and new results accomplished since the particular embodiments herein shown and described are only some of the many that can be employed to obtain these objects and accomplish these results.

We claim:

1. An electrical connection for connecting busbars for providing substantially uniform current distribution through the transverse cross-section of the connection comprising a flexible elongated flat jumper formed of a plurality of individual conductors disposed in a longitudinally extending array and having a transverse end surface which encompasses substantially the entire jumper cross section including a section through each of the individual conductors thereof and forms an angle of less than 90° with the longitudinal axis of the main body of the jumper; a conductive member having a terminal surface; clamping means having a pressure-transmitting surface for engaging a longitudinal surface of the jumper, and a pressure-receiving surface disposed substantially parallel to the jumper end surface; and pressure-applying means engaging the conductive member and the pressure-receiving surface and acting substantially perpendicularly to said terminal surface for pressing the jumper end surface against the conductive member terminal surface to urge the section of each individual conductor in said jumper end surface into direct physical contact with said terminal surface.

2. The electrical connection of claim 1 wherein said jumper, said conductive member, and said clamping means include axially aligned openings forming in combination a common passage substantially normal to the jumper end surface; and said pressure-applying means comprises threaded bolt means disposed in said passage.

3. The electrical connection of claim 1 wherein an end portion of the jumper is bent and formed to position the said transverse end surface substantially parallel to the adjacent longitudinal surface thereof.

4. The electrical connection of claim 1 further including an auxiliary clamp for fixedly clamping the jumper to the clamping means.

5. The connection of claim 4 wherein the auxiliary clamp comprises a rigid pressure bar and threaded bolt means engaging the bar and the clamping means for compressing the jumper therebetween.

References Cited by the Examiner

UNITED STATES PATENTS

| | | | |
|---|---|---|---|
| Re. 22,412 | 12/1943 | Schultz et al. | |
| 1,163,703 | 12/1915 | Taylor | 339—263 |
| 1,757,822 | 5/1930 | Woofter | 339—263 |
| 2,231,149 | 2/1941 | Baum | 339—2 |
| 2,786,922 | 3/1957 | Stumpfhaus. | |

JOSEPH D. SEERS, *Primary Examiner*.